US012561393B2

(12) United States Patent
Nemlekar

(10) Patent No.: US 12,561,393 B2
(45) Date of Patent: *Feb. 24, 2026

(54) PIPELINED MATRIX MULTIPLICATION AT A GRAPHICS PROCESSING UNIT

(71) Applicant: ADVANCED MICRO DEVICES, INC., Santa Clara, CA (US)

(72) Inventor: Milind N. Nemlekar, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 1088 days.

This patent is subject to a terminal disclaimer.

(21) Appl. No.: 17/499,708

(22) Filed: Oct. 12, 2021

(65) Prior Publication Data

US 2022/0138002 A1 May 5, 2022

Related U.S. Application Data

(63) Continuation of application No. 16/211,954, filed on Dec. 6, 2018, now Pat. No. 11,175,946.

(51) Int. Cl.
*G06F 17/16* (2006.01)
*G06N 3/044* (2023.01)
*G06T 1/20* (2006.01)

(52) U.S. Cl.
CPC ............. *G06F 17/16* (2013.01); *G06N 3/044* (2023.01); *G06T 1/20* (2013.01)

(58) Field of Classification Search
CPC .................................. G06T 1/20; G06F 17/16
See application file for complete search history.

(56) References Cited

U.S. PATENT DOCUMENTS

2018/0189236 A1 7/2018 Korthikanti et al.
2018/0315158 A1 11/2018 Nurvitadhi et al.
(Continued)

FOREIGN PATENT DOCUMENTS

CN 108780441 B 9/2022
EP 3346392 7/2018
EP 3396533 10/2018

OTHER PUBLICATIONS

Office Action issued in Indian Application No. 202117024581, mailed Jan. 27, 2023, 7 Pages.
(Continued)

*Primary Examiner* — Andrew Caldwell
*Assistant Examiner* — Jonathan David Warner

(57) ABSTRACT

A graphics processing unit (GPU) schedules recurrent matrix multiplication operations at different subsets of CUs of the GPU. The GPU includes a scheduler that receives sets of recurrent matrix multiplication operations, such as multiplication operations associated with a recurrent neural network (RNN). The multiple operations associated with, for example, an RNN layer are fused into a single kernel, which is scheduled by the scheduler such that one work group is assigned per compute unit, thus assigning different ones of the recurrent matrix multiplication operations to different subsets of the CUs of the GPU. In addition, via software synchronization of the different workgroups, the GPU pipelines the assigned matrix multiplication operations so that each subset of CUs provides corresponding multiplication results to a different subset, and so that each subset of CUs executes at least a portion of the multiplication operations concurrently.

20 Claims, 4 Drawing Sheets

(56) References Cited

U.S. PATENT DOCUMENTS

| | | | | |
|---|---|---|---|---|
| 2019/0065208 A1* | 2/2019 | Liu | ......................... | G06N 3/048 |
| 2020/0133992 A1* | 4/2020 | Aga | ..................... | G06F 7/5324 |

OTHER PUBLICATIONS

Extended European Search Report issued in European Application No. 19893621.3, mailed Aug. 4, 2022, 10 Pages.

Rafique et al. "Communication Optimization of Iterative Sparse Matrix-Vector Multiply on GPUs and FPGAs" IEEE Transations of Parallel and Distributed Systems, vol. 26(1): 2015, 11 pages.

Li et al. "Large Scale Recurrent Neural Network on GPU" 2014 International Joint Conference on Neural Networks (IJCNN), Jul. 6-11, 2014, 8 Pages.

International Preliminary Report on Patentability issued in PCT Application No. PCT/US2019/064454, mailed Jun. 8, 2021, 9 pages.

Office Action mailed Jun. 18, 2025 for Korean Application No. 10-2021-7019109, 7 pages.

Office Action mailed Aug. 8, 2025 for Chinese Application No. 201980080852.7, 6 pages.

Office Action mailed Mar. 28, 2025 for Chinese Application No. 201980080852.7, 7 pages.

* cited by examiner

400

RECIEVE RNN KERNEL —402

SCHEDULE ACTIVATION MATRIX (C) MULTPLICATIONS AT DIFFERENT CU SUBSET —404

CALCULATE C SUBMATRICES AND PIPELINE RESULTS TO NEXT CU SUBSET —406

PROVIDE RNN RESULTS BASED ON ACTVATION MATRICES —408

PIPELINED MATRIX MULTIPLICATION AT A GRAPHICS PROCESSING UNIT

CROSS-REFERENCE TO RELATED APPLICATIONS

The present application is a continuation application of U.S. patent application Ser. No. 16/211,954, entitled "PIPELINED MATRIX MULTIPLICATION AT A GRAPHICS PROCESSING UNIT", and filed on Dec. 6, 2018, the entirety of which is incorporated by reference herein.

BACKGROUND

Description of the Related Art

Modern processor applications often require relatively complex manipulation of vectors, matrices, and similar structures. For example, vector and matrix manipulation is useful in graphics operations, digital signal processing applications, neural network applications, and the like. To enhance processing efficiency for these applications and operations, a processor can include a graphics processing unit (GPU). The GPU includes specialized hardware to perform parallel processing for relatively large blocks of data. Accordingly, the GPU can support graphics applications, as well as other operations that require vector and matrix manipulation. To further enhance processing efficiency, a scheduler at the GPU schedules the operations, such as matrix multiplication, at the CUs to ensure parallel processing. However, conventional approaches to scheduling can, for some sets of operations, require a large number of memory fetch cycles relative to the number of compute cycles, thereby negatively impacting processor performance.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate techniques for scheduling recurrent matrix multiplication operations at different subsets of CUs of a GPU to enhance processing efficiency. The GPU includes a scheduler that receives sets of recurrent matrix multiplication operations, such as multiplication operations associated with a recurrent neural network (RNN). The multiple operations associated with, for example, an RNN layer are fused into a single kernel, which is scheduled by the scheduler such that one work group is assigned per compute unit, thus assigning different ones of the recurrent matrix multiplication operations to different subsets of the CUs of the GPU. In addition, via software synchronization of the different workgroups, the GPU pipelines the assigned matrix multiplication operations so that each subset of CUs provides corresponding multiplication results to a different subset, and so that each subset of CUs executes at least a portion of the multiplication operations concurrently, thereby enhancing the efficiency of matrix multiplication at the GPU.

In contrast to the techniques described herein, the conventional approach the result area of a matrix is sliced across all the CUs of a GPU at a time. With the increasing number of CUs in a GPU, keeping all the CUs busy with the matrix multiplication operations is inefficient. For example, the ratio of memory fetch cycles to compute cycles is relatively poor. By employing the techniques described herein, the GPU is able to get more work done in parallel, and to have a larger result area of a matrix to work with per CU. This approach masks bandwidth limitations as well as latency of the fetch operations to fetch matrix data.

Figure 1:
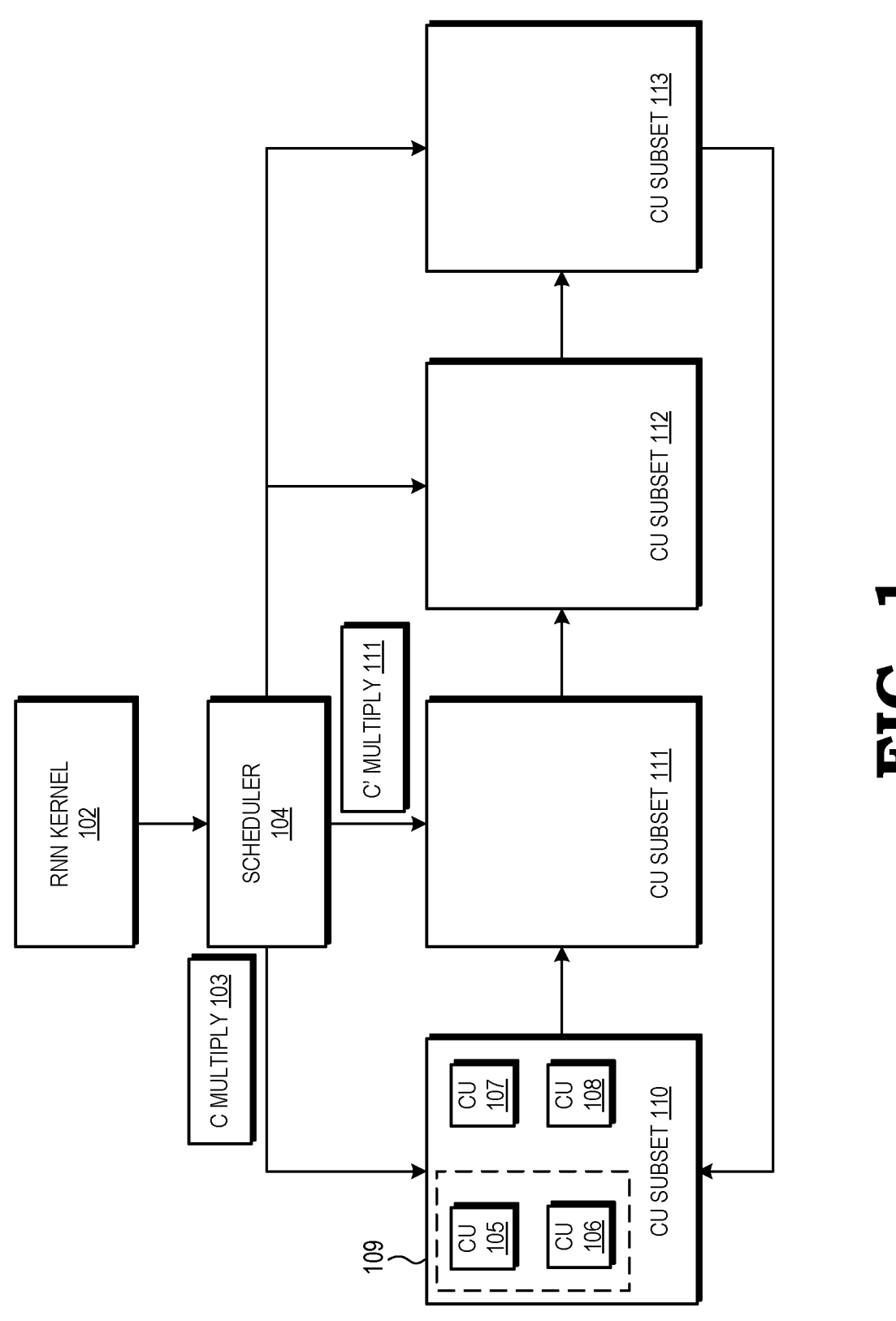
FIG. 1 is a block diagram of a graphics processing unit (GPU) that schedules sets of matrix multiplication operations at different subsets of CUs and pipelines results between the different subsets in accordance with some embodiments.

FIG. 1 illustrates a GPU 100 of a processor that employs shared loads in accordance with some embodiments. In at least one embodiment, the GPU 100 is part of a processor that is generally configured to execute sets of instructions in order to carry out operations on behalf of an electronic device. Accordingly, in different embodiments the GPU 100 is part of an electronic device such as a desktop or laptop computer, a server, a handheld electronic device such as a smartphone or tablet, a game console, and the like. The GPU 100 is generally configured to execute graphics and vector processing operations on behalf of the processor. For example, in some embodiments, a central processing unit (CPU, not shown at FIG. 1) of the processor provides the GPU 100 with sets of operations for execution, whereby the sets of operations are associated with graphics or vector processing.

One type of set of operations that is provided by the CPU is referred to herein as a set of recurrent matrix multiplication operations. As used herein, recurrent matrix multiplication operations refer to sets of matrix multiplication operations wherein the results of at least one of the matrix multiplication operations of the set is provided to at least one other matrix multiplication operation of the set. An example of a set of matrix multiplication operations is a set associated with a recurrent neural network (RNN). As will be appreciated by one skilled in the art, an RNN is implemented via a series of general matrix multiply (GEMM) operations followed by activation functions (e.g., a tanh activation function), The weight matrix associated with the recurrent GEMM operations is constant across all hidden layers. This property of the weight matrix can be used to preload this matrix in registers and thereby reduce fetch in every iteration of the multiplication operation. Thus, the RNN employs a set of recurrent matrix multiplication operations to implement the RNN, as described further herein.

To facilitate execution of the provided operations, the GPU 100 includes a plurality of CUs (e.g. CUs 105-108). Each of the CUs is configured to execute assigned operations independently of, and concurrent with, the other CUs to allow the GPU 100 to execute complex operations, such as matrix multiplication, relatively quickly. Accordingly, in some embodiments, each of the CUs includes a plurality of Single-Instruction Multiple-Data (SIMD) processing units, fetch and decode logic to fetch and decode instructions for the SIMD units, a register file to store operands for the SIMD units, and the like.

To support efficient execution of operations at the CUs, the GPU 100 includes a scheduler 104 that is generally configured to assign operations to different ones of the CUs according to specified scheduling criteria. In some embodiments, the criteria are set in part by the sets of operations, referred to as a kernel, provided to the GPU 100. To support recurrent matrix multiply operations, the scheduler 104 logically divides the CUs of the GPU into subsets, designated CU subsets 110-113. It will be appreciated that in other embodiments the scheduler 104 logically divides the CUs into more or fewer subsets. As used herein, a subset refers to a set including some, but not all, of the CUs of a GPU. Thus, for example, in an embodiment wherein the GPU 100 includes a total of 128 CUs, each of the CU subsets 110-113 includes a different set of 32 CUs, and each of the 128 CUs is in a different one of the CU subsets 110-113.

In some embodiments, a kernel logically divides each CU subset 110-113 into smaller subsets, referred to herein as CU clusters for clarity. It will be appreciated that in some embodiments, different operations of the scheduler 104 can be performed by a hardware scheduler, by software scheduling operations, or a combination thereof. As used herein, a CU cluster is a set of CUs that includes some, but not all of the CUs of a CU subset. For example, the CU subset 110 includes CUs 105-108, wherein CUs 105 and 106 are included in one CU cluster (designated CU cluster 109) while CUs 107 and 108 are included in a different CU cluster of the CU subset 110. In the above example where each of the CU subsets 110-113 includes 32 CUs, each CU cluster includes 8 CUs of the corresponding CU subset, with each CU included in a different CU cluster.

By logically dividing the CUs into subsets and clusters, the kernel schedules recurrent matrix multiply operations to reduce data fetches to the different CUs. To illustrate, each CU of the GPU 100 includes registers, buffers, or other storage elements (not shown at FIG. 1) to store the operands employed in matrix multiplication. For recurrent matrix multiplication operations, at least one matrix is used repeatedly in the corresponding matrix multiplications. Accordingly, and as described further herein, the GPU 100 divides the at least one matrix into submatrices, with the different submatrices used repeatedly to calculate the final result of the recurrent matrix multiplication operations. Accordingly, to perform recurrent matrix multiplication operations, the scheduler 104 assigns different ones of the corresponding matrix multiplication operations to different ones of the CU subsets 110-113. Each of the CUs 110-113 loads the corresponding submatrices into its corresponding storage elements (e.g. registers) and maintains at least some of the submatrices in the storage elements for multiple matrix multiplications. Thus, as described further herein, the same submatrices are not fetched to all of the CUs of the GPU 100, but only to the corresponding CU subsets and CU clusters. In contrast, under a conventional matrix multiplication approach, the matrix multiplications would be divided among all the CUs of the GPU 100, reducing efficiency.

Figure 2:
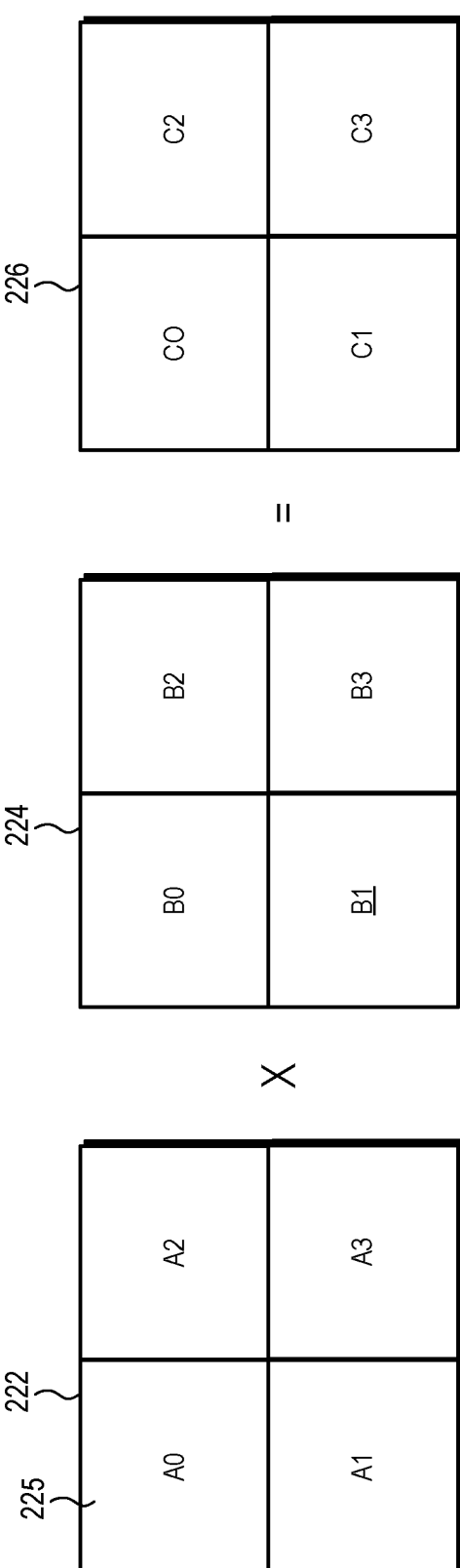
FIG. 2 is a block diagram illustrating an example of decomposing matrices for matrix multiplication at the GPU of FIG. 1 in accordance with some embodiments.

To illustrate via an example, in the illustrated embodiment the GPU 102 implements an RNN kernel 102 that defines a set of recurrent matrix multiplication operations wherein a matrix A is multiplied by a matrix B to generate a matrix C. An example is illustrated at FIG. 2 in accordance with some embodiments wherein matrix 222 is matrix A, matrix 224 is matrix B, and the resulting matrix 226 is designated matrix C. The multiplication of A and B is expressed by the following formula:

$$C = A*B$$

In some embodiments, matrix A is a set of neural network weights, matrix B is a set of initial inputs, and C is the output of an activation function for the neural network. Because the neural network is a recurrent neural network, the RNN kernel 102 also defines a matrix multiplication operation for C' wherein:

$$C' = A*C$$

In some embodiments defines additional matrix multiplication operations for matrices C'', C''', and so on, for a specified number of $C''$ matrices, where each $C''$ matrix is a function of the previous C matrix, except for the initial C matrix, which is a function of the matrix B as indicated above. Referring again to FIG. 1, hardware barriers are configured to assign the generation of each $C''$ matrix to one of the CU subsets 110-113. For example, the scheduler 104 assigns the matrix multiplication operation that generates matrix C, designated operation 103, to the CU subset 110 and assigns the matrix multiplication operation that generates matrix C' to the CU subset 111. Each CU subset executes the assigned matrix multiplication operation to generate the corresponding $C''$ matrix and provides the $C''$ matrix to another CU subset for generation of the next $C''$ matrix until all of the matrix multiplication operations for the RNN kernel 102 are complete. Thus, for example, in some embodiments the CU subset 110 provides the matrix C to the CU subset 111 to calculate the matrix C', the CU subset 111 provides the matrix C' to the CU subset 112 to calculate the matrix C'', the CU subset 112 provides the matrix C'' to the CU subset 113 to calculate the matrix C''', the CU subset provides the matrix C''' to the CU subset C'''', and so on until the final $C''$ matrix is calculated.

Further, in some embodiments the CU subsets 110-113 perform the corresponding matrix multiplication operations via a series of multiplications, with each multiplication in the series generating a portion of the corresponding $C''$ matrix. Each of the CU subsets 110-113 provides the generated portion of the corresponding $C''$ matrix to the next CU subset, which uses the provided portion to generate a corresponding portion of the next $C''$ matrix. Scheduling matrix multiplications in this way allows the GPU 100 to pipeline the different multiplications to enhance processing efficiency, as described further below. In addition, in some embodiments the scheduler 104 schedules the individual matrix multiplications at different CU clusters to improve the ratio of compute cycles to memory fetch cycles for each CU.

To illustrate, and referring to FIG. 2, to multiply matrix A and matrix B, the GPU 100 is generally configured to decompose the matrices A and B into submatrices (e.g., submatrix 225), with each submatrix being a portion of the corresponding matrix. Thus, the GPU 100 decomposes the matrix A into the illustrated submatrices A0-A3, and the matrix B into the illustrated submatrices B0-B3. The GPU 100 uses the submatrices to calculate corresponding submatrices C0-C3 according to the following formulas:

$$C0 = A0*B0 + A2*B1$$

$$C1 = A1*B0 + A3*B1$$

$$C2 = A0*B2 + A2*B3$$

$$C3 = A1*B2 + A3*B3$$

The GPU 100 uses the resulting submatrices of C to calculate corresponding submatrices C0'-C3' according to the following formulas:

$$C0'=A0*C0+A2*C1$$

$$C1'=A1*C0+A3*C1$$

$$C2'=A0*C2+A2*C3$$

$$C3'=A1*C2+A3*C3$$

The GPU 100 calculates each $C''$ matrix using similar formulas.

To enhance processing efficiency, the scheduler 100 schedules individual matrix multiplication operations at CU clusters such that the A submatrix used by the CU cluster does not change. For example, in some embodiments, the CU subset 110 is assigned to calculate the matrix C and the matrix C''''. Calculating the matrix C requires the following multiplications with the A0 submatrix:

$$A0*B0$$

$$A0*B2$$

Calculating the matrix C'''' requires the following multiplications with the A0 submatrix:

$$A0*C0'''$$

$$A0*C2'''$$

Accordingly, to keep the number of data fetches relatively low, the scheduler 100 schedules all multiplication operations for a given A submatrix at a given CU subset to the same CU cluster. Thus, for example, in some embodiments the scheduler 104 assigns each matrix multiplication that requires the A0 submatrix and is used to calculate the submatrices assigned to the CU subset 110, to the same CU cluster (e.g., CU cluster 109). Similarly, the scheduler 104 the scheduler 104 assigns each matrix multiplication that requires the A0 submatrix and is used to calculate the submatrices assigned to the CU subset 111, to the same CU cluster at the CU subset 111, and so on for each CU subset. Each CU cluster is thus able to maintain the corresponding A submatrix in the corresponding register file (or other storage modules) for multiple different matrix multiplications.

In addition, it can be seen from the above formulas that only some of the submatrices of a given $C''$ matrix are needed to calculate corresponding submatrices for the next $C''$ matrix. For example, once the CU subset 110 has calculated the submatrices C0 and C1, all the data needed to calculate the submatrices C0' and C1' is calculated. Accordingly, after calculating the C0 and C1 submatrices, the CU subset 110 provides the submatrices to the CU subset 111 to calculate C0' and C1'. In some embodiments, the CU subset 110 provides the C0 and C1 submatrices prior to (or concurrent with) calculating the C2 and C3 matrices. The matrix multiplications are thereby pipelined across the CU subsets 110-113 to enhance processing efficiency.

Figure 3:
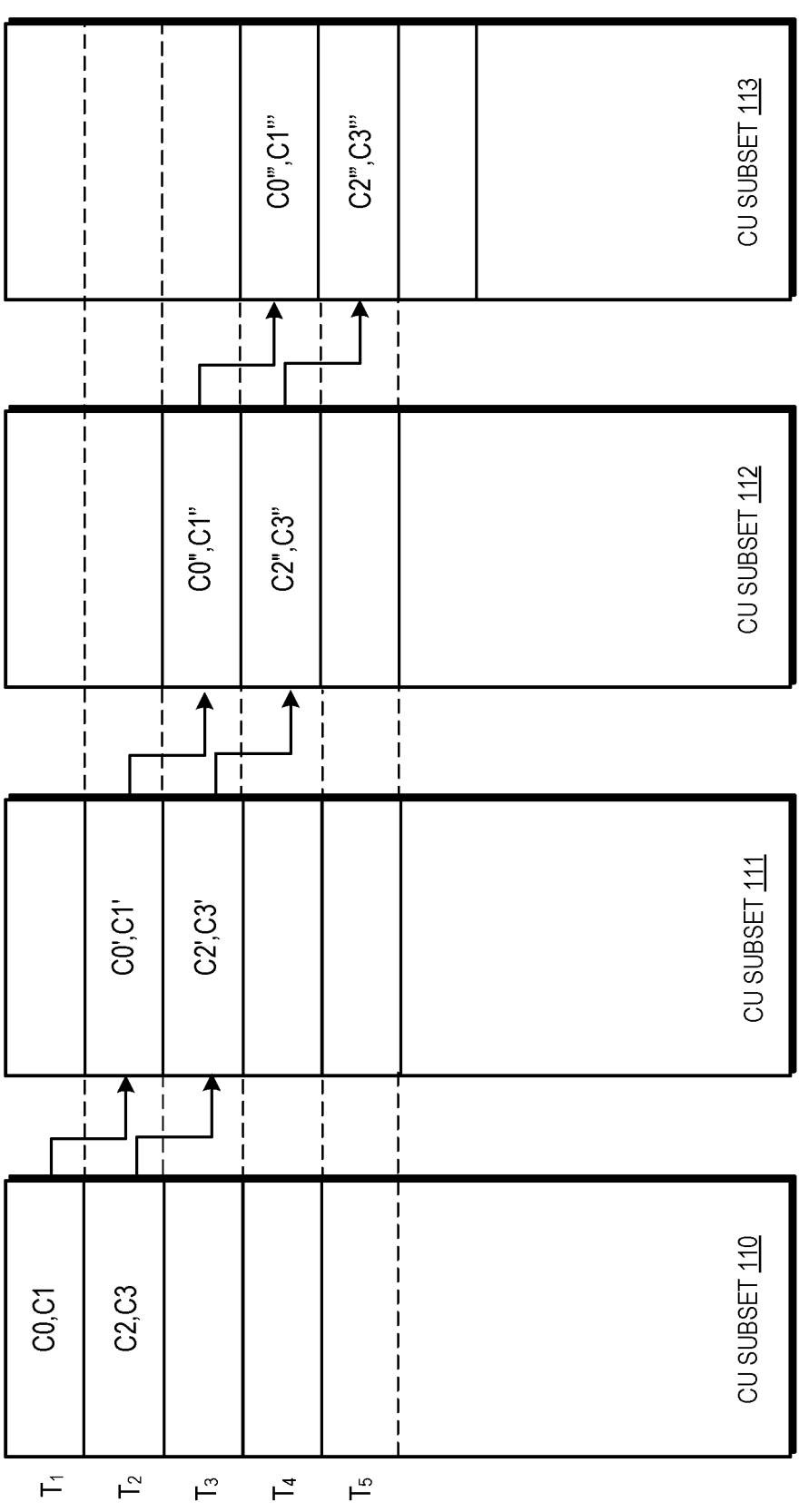
FIG. 3 is a diagram illustrating an example of pipelining matrix multiplication operations at subsets of the CUs of FIG. 1 in accordance with some embodiments.

An example of such pipelining of matrix multiplications is illustrated at FIG. 3 in accordance with some embodiments. FIG. 3, illustrates a sequence of time periods, designated $T_1$ through $T_5$, wherein during each time period a portion of a $C''$ matrix is calculated by at least one of the CU subsets 110-113. It will be appreciated that in some embodiments each time period includes multiple processing cycles or clock cycles of the CU subsets 110-113. In the depicted example, during time period $T_1$, the CU subset 110 calculates the C0 and C1 submatrices and provides the submatrices to the CU subset 111.

During the succeeding time period $T_2$, the CU subset 110 calculates the C2 and C3 submatrices and provides the submatrices to the CU subset 111. In addition, because all of the submatrices needed to calculate C0' and C1' are available, during the time period $T_2$ the CU subset 111 calculates the submatrices C0' and C1' and provides the submatrices. That is, during time period $T_2$ the CU subset 110 and the CU subset 111 concurrently calculate the submatrices C0 and C1, and C0' and C1', respectively.

During the succeeding time period $T_3$, the CU subset 111 calculates the C2' and C3' submatrices and the CU subset 112 calculates the C0'' and C1'' submatrices. During the next time period $T_4$, the CU subset 112 calculates the C2'' and C3'' submatrices and the CU subset 113 calculates the C0''' and C1''' submatrices. During the next time period $T_5$ the CU subset 113 calculates the C2''' and C3''' submatrices. Thus, as illustrated, the matrix multiplication operations are pipelined across the CU subsets 110-113 to enhance processing efficiency. In some embodiments, the A, B, and C matrices are larger matrices, with a higher number of submatrices, further enhancing the efficiency of the illustrated pipeline. For example, for a larger C matrix, the CU subset 11 can calculate C4 and C5 submatrices during time period $T_3$ and C6 and C7 submatrices during time $T_4$.

Figure 4:
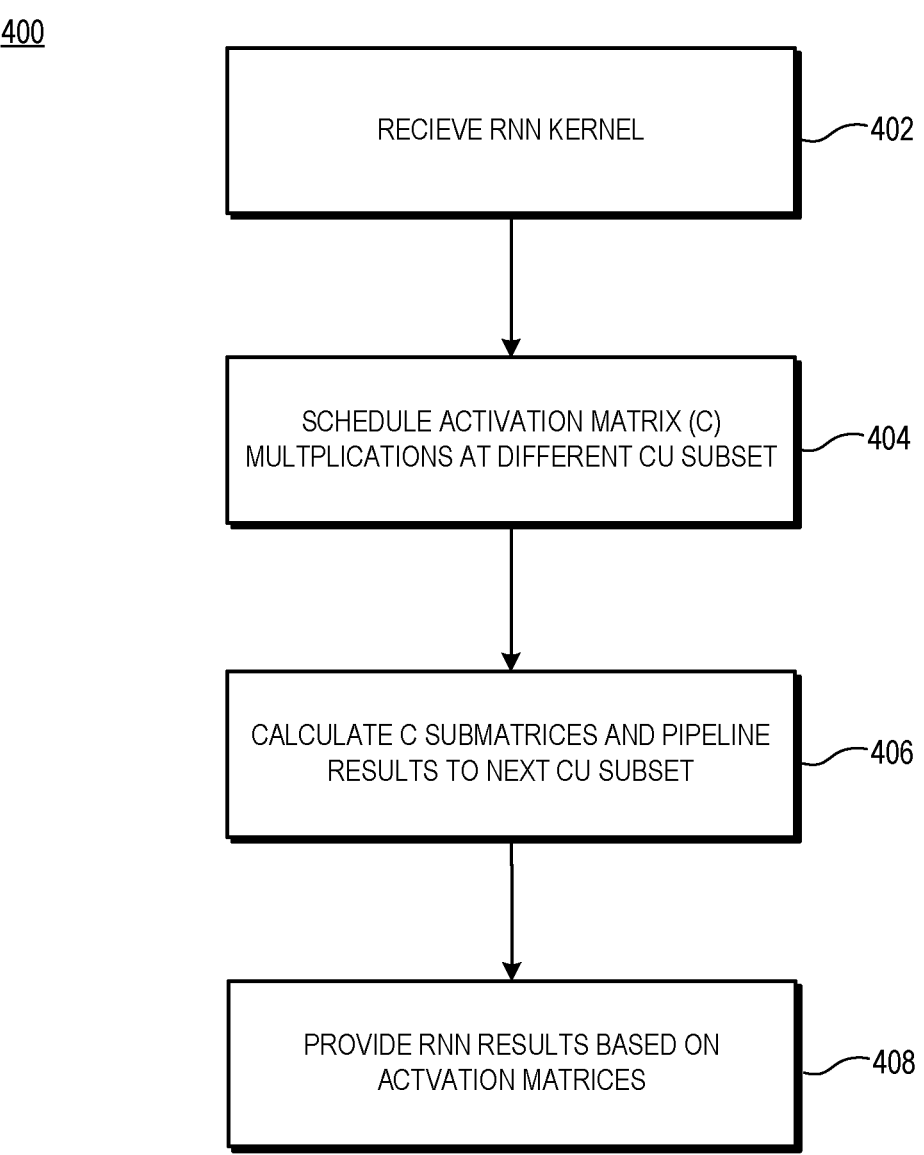
FIG. 4 is a flow diagram of a method of pipelining matrix multiplication operations at a CPU in accordance with some embodiments.

FIG. 4 illustrates a block diagram of a method 400 of pipelining matrix multiplication operations at a GPU in accordance with some embodiments. The method 400 is described with respect to an example implementation at the GPU 100 of FIG. 1. At block 402 the GPU 100 receives the RNN kernel 102, indicating the matrix multiplication operations to be performed as well as the matrices A and B. At block 404 the scheduler 104 schedules the multiplication of the different $C^N$ matrices at the CU subsets 110-113, and further schedules the multiplications for each submatrix for each $C^N$ matrix at CU clusters of the CU subsets 110-113, so that the A submatrices can be maintained at the internal storage modules of the assigned clusters. At block 406 the CU subsets 110-113 calculate submatrices of the corresponding $C^N$ matrix and provide the results to the next CU subset as illustrated at FIG. 1 and FIG. 3. At block 408 the GPU provides results for the recurrent neural network to a CPU based on the matrix multiplications.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
in response to receiving at least one command including a plurality of matrix multiplication operations at a parallel processing unit comprising a plurality of compute units (CUs), scheduling a first matrix multiplication operation of the plurality of matrix multiplication operations at a first subset of CUs of the plurality of CUs and a second matrix multiplication operation of the plurality of matrix multiplication operations at a second subset of CUs of the plurality of CUs, wherein:
the second subset of CUs is different from the first subset of CUs,
the first matrix multiplication operation and the second matrix multiplication operation each include a respective multiplication of at least two matrices, and

the at least two matrices each include more than one element;
executing the first matrix multiplication operation at the first subset of CUs to produce a portion of a first matrix; and
executing the second matrix multiplication operation at the second subset of CUs to produce a portion of a second matrix, the second matrix being different from the first matrix.

2. The method of claim 1, further comprising:
providing the portion of the first matrix from the first subset of CUs to the second subset of CUs to perform the second matrix multiplication operation.

3. The method of claim 2, further comprising:
providing the portion of the second matrix to a third subset of CUs of the plurality of CUs to perform a third matrix multiplication operation to produce a portion of a third matrix, the third subset of CUs being different from the first subset and the second subset of CUs, and the third matrix being different from the first matrix and the second matrix.

4. The method of claim 3, further comprising:
providing the portion of the third matrix from the third subset of CUs to the first subset of CUs to perform a fourth matrix multiplication operation.

5. The method of claim 2, wherein:
the first matrix multiplication operation comprises a first multiplication and a second multiplication,
the second matrix multiplication operation comprises a third multiplication, and
executing the first and second matrix multiplication operations comprises executing the second multiplication concurrently with the third multiplication.

6. The method of claim 5, wherein:
the third multiplication multiplies the portion of the first matrix.

7. The method of claim 2, wherein:
the first matrix multiplication operation comprises a first multiplication and a second multiplication,
executing the first matrix multiplication operation comprises executing the first multiplication at a first cluster of the first subset of CUs and the second multiplication at a second cluster of the first subset of CUs.

8. The method of claim 7, wherein:
executing the first matrix multiplication operation comprises executing the first multiplication concurrently with the second multiplication.

9. The method of claim 1, further comprising:
generating an output of a recurrent neural network (RNN) based on the first matrix multiplication operation and the second matrix multiplication operation.

10. A parallel processor, comprising:
plurality of compute units (CUs) including a plurality of subsets; and
a scheduler configured to:
schedule, in response to receiving a plurality of matrix multiplication operations, different ones of the plurality of matrix multiplication operations at different corresponding subsets of the plurality of subsets, wherein:
each matrix multiplication operation of the plurality of matrix multiplication operations includes a respective multiplication of two matrices, each of the two matrices including more than one element,
each subset of the plurality of subsets is configured to execute one or more matrix multiplication operations to produce a portion of a matrix that is different from matrices produced at least in part by each other subset of the plurality of CUs, the parallel processor is configured to pipeline results of the plurality of matrix multiplication operations between the different corresponding subsets of the plurality of CUs.

11. The parallel processor of claim 10, wherein the parallel processor is further configured to:

concurrently execute portions of the plurality of matrix multiplication operations at the different corresponding subsets of the plurality of subsets.

12. An apparatus comprising:

a parallel processing unit, comprising:

a plurality of CUs, including a first subset of CUs and a second subset of CUs, the second subset of CUs different from the first subset of CUs;

a scheduler configured to:

in response to receiving a plurality of matrix multiplication operations for execution, schedule a first matrix multiplication operation of the plurality of matrix multiplication operations at the first subset of CUs and a second matrix multiplication operation of the plurality of matrix multiplication operations at the second subset of CUs; and wherein the first subset of CUs is configured to execute the first matrix multiplication operation to produce a portion of a first matrix and second subset of CUs is configured to execute the second matrix multiplication operation to produce a portion of a second matrix, the second matrix being different from the first matrix, wherein the first matrix multiplication operation and the second matrix multiplication operation each include a respective multiplication of at least two corresponding matrices each including at least two elements.

13. The apparatus of claim 12, wherein:

the first subset of CUs is configured to provide the portion of the first matrix to the second subset of CUs to perform the second matrix multiplication operation.

14. The apparatus of claim 13, wherein:

the second subset of CUs is configured to provide a portion of the second matrix to a third subset of CUs of the plurality of CUs to perform a third matrix multiplication operation to produce a portion of a third matrix, the third matrix being different from the first matrix and the second matrix, and, the third subset of CUs being different from the first subset and the second subset of CUs.

15. The apparatus of claim 14, wherein:

the third subset of CUs is configured to provide the portion of the third matrix to the first subset of CUs to perform a fourth matrix multiplication operation.

16. The apparatus of claim 13, wherein:

the first matrix multiplication operation comprises a first multiplication and a second multiplication;

the second matrix multiplication operation comprises a third multiplication, the first subset of CUs is configured to execute the second multiplication concurrently with the second subset of CUs configured executing the third multiplication.

17. The apparatus of claim 16, wherein:

the third multiplication multiplies the portion of the first matrix.

18. The apparatus of claim 13, wherein:

the first subset of CUs comprises a first cluster of CUs and a second cluster of CUs, the second cluster different from the first cluster; and the first matrix multiplication operation comprises a first multiplication and a second multiplication, wherein the first subset of CUs is configured to execute the first multiplication at the first cluster of the first subset of CUs and the second multiplication at the second cluster of the first subset of CUs.

19. The apparatus of claim 18, wherein:

the first subset of CUs is configured to execute the first matrix multiplication operation concurrently with the second multiplication.

20. The apparatus of claim 12, wherein the parallel processing unit is configured to:

generate an output of a recurrent neural network (RNN) based on the first matrix multiplication operation and the second matrix multiplication operation.

* * * * *